United States Patent
Huang

(10) Patent No.: US 6,771,409 B2
(45) Date of Patent: Aug. 3, 2004

(54) SIMULTANEOUS WAVELENGTH CONVERSION AND AMPLITUDE MODULATION IN A MONOLITHIC QUASI-PHASE-MATCHED (QPM) NONLINEAR OPTICAL CRYSTAL

(76) Inventor: Yen-Chieh Huang, Department of Electrical Engineering, National Tsinghua University, Hsinchu (TW), 30043

( * ) Notice: Subject to any disclaimer, the term of this patent is extended or adjusted under 35 U.S.C. 154(b) by 0 days.

(21) Appl. No.: 10/025,563

(22) Filed: Dec. 19, 2001

(65) Prior Publication Data

US 2003/0112492 A1 Jun. 19, 2003

(51) Int. Cl.[7] .................................................. G02F 1/01
(52) U.S. Cl. ....................................... 359/238; 359/276
(58) Field of Search ................................ 359/238, 276, 359/278, 239, 248, 237, 245, 279, 315, 320, 321, 322

(56) References Cited

U.S. PATENT DOCUMENTS 5,943,464 A * 8/1999 Khodja ......................... 385/122
6,167,169 A * 12/2000 Brinkman et al. ............. 385/4
6,304,585 B1 * 10/2001 Sanders et al. ................ 372/22
6,493,473 B1 * 12/2002 Wooten ......................... 385/11

OTHER PUBLICATIONS

Myers, Miller, Eckardt, Fejer, Byer, and Bosenberg, Quasi-phase-matched 1.064-μm-pumped optical parametric oscillator in bulk periodically poled $LiNbO_3$, Optics Letters, vol. 20, No. 1 (Jan. 1, 1995). United States of America.

Mizuuchi, Yamamoto, "Waveguide secnd-harmonic generation device with broadened flat quasi-phase-matching response by use of a grating structure with located phase shifts," Optics Letters, vol. 23, No. 24 (Dec. 15, 1998). United States of America.

* cited by examiner

Primary Examiner—Georgia Epps
Assistant Examiner—Tuyen Tra
(74) Attorney, Agent, or Firm—Trojan Law Offices

(57) ABSTRACT

An optical element capable of performing nonlinear frequency conversion and amplitude modulation simultaneously is disclosed. The optical element includes a monolithically integrated, electrode-coated dispersion nonlinear optical crystal section between two quasi-phase-matched (QPM) nonlinear optical crystal sections. By electrically controlling the relative phase among the mixing waves in the dispersion section, nonlinear frequency conversion and amplitude modulation can be performed simultaneously.

10 Claims, 4 Drawing Sheets

SIMULTANEOUS WAVELENGTH CONVERSION AND AMPLITUDE MODULATION IN A MONOLITHIC QUASI-PHASE-MATCHED (QPM) NONLINEAR OPTICAL CRYSTAL

FIELD OF THE INVENTION

The present invention is related to an optical element, and more particularly to an optical element capable of performing wavelength conversion and amplitude modulation simultaneously.

BACKGROUND OF THE INVENTION

Quasi-phase-matched (QPM) nonlinear frequency conversion has been an attractive means for generating a wide range of laser wavelengths. For example, electric-field poled lithium niobate (PPLN) (L. E. Myers, G. D. Miller, E. C. Eckardt, M. M. Fejer, and R. L. Byer, Opt. Let. 20, 52 (1995)) has an effective nonlinear coefficient as high as 17 pm/volt, which makes PPLN an important QPM crystal for generating wavelength-tunable laser radiations. Other popular QPM crystals include periodically poled $LiTaO_3$, $KTiOPO_4$, $RbTiOAsO_4$, and so on. Different QPM crystals have different material advantages. For example, when compared with PPLN, $LiTaO_3$ has a better transparency in the shorter wavelengths, $KTiOPO_4$ sustains higher laser fluence, and $RbTiOAsO_4$ has a much lower coercive field for electrical poling. Quasi-phase-matched frequency conversion has been applied to numerous applications such as gas sensing, optical communication, and so on. In practice, signal modulation is desirable for sensitive detection or information encoding. In all available technologies, to the knowledge of one skilled in the art, frequency conversion and signal modulation have to be implemented separately.

The conventional amplitude-modulation techniques, to name a few, include the use of an optical chopper, the current-controlled driver for diode lasers, the Mach-Zehnder modulator, and the electro-optic birefringence crystal between two crossed polarizers. However, there is no effective amplitude-modulation technique during wavelength conversion without suffering from the disadvantages of the small modulation bandwidth, frequency chirping, or complexity associated with a conventional amplitude modulator.

In addition, Quasi-phase-matched nonlinear frequency conversion imposes a 180-degree reset on the relative phase among the three mixing waves every coherence length. In a QPM crystal, any phase error in a nonlinear domain affects the efficiency or the amplitude of the wavelength-converted signals at the downstream output. By manipulating the phase mismatch, it is possible to develop a novel device for simultaneous wavelength conversion and amplitude modulation in a monolithic QPM crystal.

SUMMARY OF THE INVENTION

It is therefore an object of the present invention to provide an effective amplitude-modulation technique during wavelength conversion without suffering from the disadvantages of the small modulation bandwidth, frequency chirping, or complexity associated with a conventional amplitude modulator.

It is further an object of the present invention to provide an optical element with simultaneous wavelength conversion and amplitude modulation in a monolithic QPM nonlinear optical crystal, by manipulating the phase mismatch to alter the amplitude of the wavelength-converted signals at the downstream output.

To achieve the aforementioned objects, an optical element capable of performing nonlinear frequency conversion and amplitude modulation simultaneously is provided. The optical element comprises a nonlinear optical crystal having an electrode-coated dispersion section in quasi-phase-matched (QPM) sections for electrically controlling the relative phase among the mixing waves therein by applying an electric field thereto, whereby performing the nonlinear frequency conversion and amplitude modulation simultaneously.

Preferably, the nonlinear optical crystal is the material capable of being made into quasi-phase-matched (QPM) nonlinear optical element. More preferably, the nonlinear optical crystal is made of the material selected from a group consisting of $LiNbO_3$, $LiTaO_3$, $KTiOPO_4$, and $RbTiOAsO_4$.

In accordance with one aspect of the present invention, the electrode-coated dispersion section is sandwiched between two quasi-phase-matched (QPM) sections.

In accordance another aspect of the present invention, the electrode-coated dispersion section is coated with metal electrodes on two opposite surface thereof.

Certainly, the nonlinear frequency conversion includes second harmonic generation (SHG), difference frequency generation (DFG), sum frequency generation (SFG), optical parametric generation (OPG), optical parametric amplification (OPA), and optical parametric oscillation (OPO).

In accordance with another aspect of the present invention, the electrode-coated dispersion section is sandwiched between quasi-phase-matched nonlinear gratings, the nonlinear gratings have both the grating vectors parallel to the wave vector of the mixing waves, and the amplitude modulation can be adjusted to either the linear or the nonlinear modulation regime with a direct-current voltage offset on the electrodes.

In accordance with another aspect of the present invention, the electrode-coated dispersion section is sandwiched between quasi-phase-matched nonlinear gratings. One of the nonlinear gratings has the grating vector parallel to the wave vector of the mixing waves, the other nonlinear grating has the grating vector forming an angle with respect to the wave vector of the mixing waves, and the amplitude modulation can be adjusted to either the linear or the nonlinear modulation regime by laterally translating the nonlinear crystal with respect to stationary mixing waves.

It is further an object of the present invention to provide a method for performing nonlinear frequency conversion and amplitude modulation simultaneously. The method includes the steps of fabricating a quasi-phase-matched (QPM) crystal with an embedded electrode-coated unpoled dispersion section, and applying an electric field to the electrode-coated unpoled dispersion section for controlling the relative phase among the mixing waves in the dispersion section, whereby performing the nonlinear frequency conversion and amplitude modulation simultaneously.

It is still an object of the present invention to provide an optical element capable of performing nonlinear frequency conversion and amplitude modulation simultaneously. The optical element includes a nonlinear optical crystal having multiple electrode-coated dispersion sections monolithically integrated in cascaded quasi-phase-matched (QPM) sections for electrically controlling the relative phase among the mixing waves therein by applying an electric field thereto, whereby performing the nonlinear frequency conversion and amplitude modulation simultaneously.

Preferably, each of the quasi-phase-matched (QPM) sections is the crystal section for performing one of the nonlinear optical processes, including second harmonic generation (SHG), difference frequency generation (DFG), sum frequency generation (SFG), optical parametric generation (OPG), optical parametric amplification (OPA), and optical parametric oscillation (OPO).

In accordance with one aspect of the present invention, the nonlinear optical crystal includes two electrode-coated dispersion sections interleaved in three quasi-phase-matched (QPM) sections for performing the nonlinear frequency conversion and amplitude modulation simultaneously.

It is further an object of the present invention to provide an optical element capable of performing nonlinear frequency conversion and amplitude modulation simultaneously. The optical element includes a nonlinear optical crystal having at least one electrode-coated dispersion section integrated in cascaded quasi-phase-matched (QPM) sections for electrically controlling the relative phase among the mixing waves therein by applying an electric field thereto, and a waveguide formed in the nonlinear optical crystal for guiding the mixing waves through the QPM sections and the dispersion section in the nonlinear optical crystal, whereby performing the nonlinear frequency conversion and amplitude modulation simultaneously.

In accordance with another aspect of the present invention, an optical waveguide, going through the QPM sections and the dispersion section of the present invention, can be fabricated on the surface of the nonlinear optical crystal and the conducting electrodes are coated with conducting materials on the two sides of the waveguide, whereby the relative phase of the mixing waves is controlled by the applied electric field on the electrodes.

It may best be understood through the following descriptions with reference to the accompanying drawings, in which:

DETAILED DESCRIPTION OF THE PREFERRED EMBODIMENT

Figure 1:
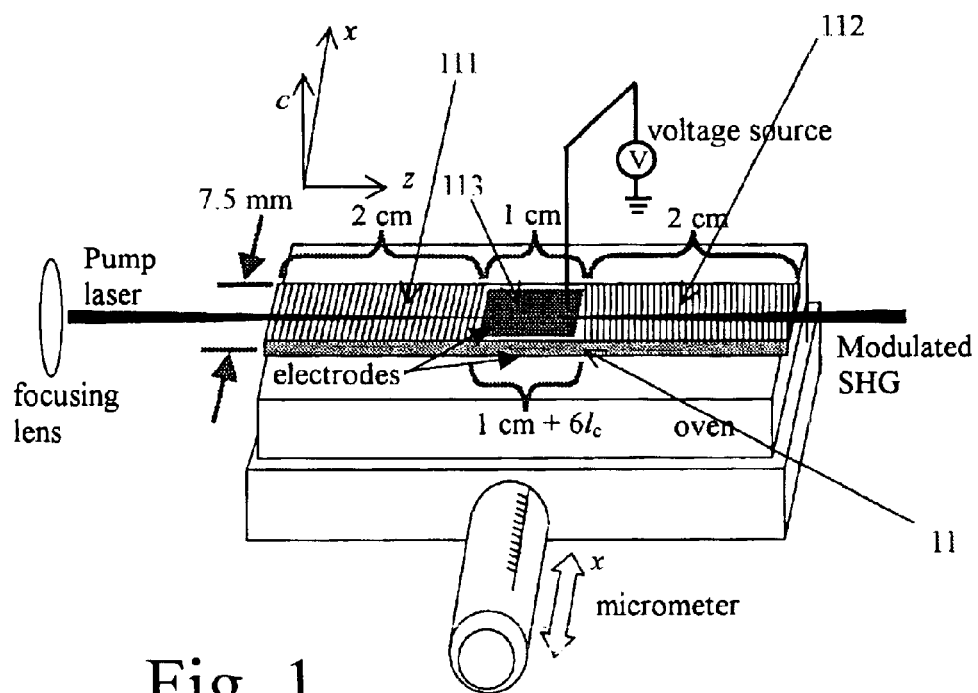
FIG. 1 is a schematic diagram showing the simultaneous frequency conversion and amplitude modulation according to the preferred embodiment of the present invention.

By manipulating the phase mismatch in a QPM crystal, one may perform simultaneous amplitude modulation and wavelength conversion on a QPM nonlinear wavelength converter. Without losing generality, the following analysis and experiment for a second-harmonic-generation (SHG) example is carried out. Assume that a QPM crystal consists of three cascaded sections with an unpoled dispersion section of length $l_d$ sandwiched between two QPM sections of length $l_1$ and $l_2$. The two QPM sections, having a grating period of $\Lambda_g$, are designed to perform the SHG of a fundamental frequency $\omega$ or wavelength $\lambda_\omega$. Hereafter, the subscripts $\omega$ and $2\omega$ refer to the quantities associated with the fundamental wave and the SHG wave, respectively. Under the slowly varying envelope approximation and in the low conversion limit, the SHG envelope fields, $E_{2\omega,1}$ and $E_{2\omega,2}$, generated from the two QPM sections $l_1$ and $l_2$ with the mth-order QPM process, are given by $$E_{2\omega,1} = \Gamma \int_0^{l_1} e^{-i\Delta k z} dz, \tag{1.a}$$

and $$E_{2\omega,2} = \Gamma e^{-i\Delta k_0 l_d} \int_0^{l_1} e^{-i\Delta k z} dz, \tag{1.b}$$

where $\Delta k_0 = k_{2\omega} - 2k_\omega$ is the wave vector mismatch in the dispersion section, and $\Delta k = \Delta k_0 - 2\pi m/\Lambda_g$ is the wave vector mismatch of the mth-order QPM. The coupling coefficient is $\Gamma = i d_{eff,m} \omega E_\omega^2 / n_{2\omega} c$, where $d_{eff,m}$ is the effective nonlinear coefficient of the mth-order QPM, $n_{2\omega}$ is the refractive index of the SHG laser, and c is the velocity of light in a vacuum. In writing Eq. (1.b), it has been assumed that negligible SHG power is generated from the dispersion section, and the first QPM domains in the first and second QPM sections have the same crystal polarization. The total SHG power of such a device can be calculated from the coherent sum of Eqs. (1), given by $$P_{2\omega}=P_1+P_2+2\sqrt{P_1 P_2}\cos(\Delta k_0 l_d)=(\sqrt{P_1}-\sqrt{P_2})^2+4\sqrt{P_1 P_2}\cos^2(\Delta k_0 l_d/2) \tag{2}$$

where $P_{1,2}$ is the SHG power associated with the envelope fields $E_{2\omega,1}$ and $E_{2\omega,2}$, respectively. If the length of the dispersion section is varied, Eq. (2) has a period of $2\pi/\Delta k_0$, which is twice the coherence length defined by $l_c=\pi/\Delta k_0$.

The phase term in Eq. (2) can be further expressed as $\Delta\phi = \Delta k_0 l_d = 2\pi(n_{2\omega}-n_\omega)l_d/\lambda_{2\omega}$. In an electro-optic crystal, the refractive index is a function of the electric field, given by $n(E) = n - r n^3 E/2$ where E is the applied electric field, n is the refractive index in the absence of the electric field, and r is the Pockels coefficient. In a QPM crystal such as PPLN, the fundamental and SHG waves are polarized in the crystallographic c axis, having extraordinary refractive indices $n_{\omega,e}$ and $n_{2\omega,e}$, respectively. If a transverse electric field along c is applied to the dispersion section of such a QPM crystal, the phase term $\Delta\phi$ can be recast into the expression $$\Delta\phi = \Delta\phi_0 - \pi\frac{V}{V_\pi}, \tag{3}$$

where $\Delta\phi_0$ is the phase mismatch in the absence of the electric field, and $V_\pi$ is the half-wave voltage given by $$V_\pi = \frac{d}{l_d}\frac{\lambda_{2\omega}}{(r_{33,2\omega}n_{2\omega,e}^3 - r_{33,\omega}n_{\omega,e}^3)}. \tag{4}$$

The parameter d is the separation distance of the electrodes. Equation (4) differs from that for a conventional birefringence electro-optic amplitude modulator installed between a pair of crossed polarizers. A birefringence amplitude modulator has two waves polarized perpendicularly, relying on the birefringence in refractive indices and Pockels coefficients at a particular wavelength for amplitude modulation. For a QPM crystal using the $d_{33}$ nonlinear coefficient, the proposed modulation scheme relies on material dispersion of the two extraordinary waves.

FIG. 1 is a schematic diagram showing the simultaneous frequency conversion and amplitude modulation according to the preferred embodiment of the present invention. As shown in FIG. 1, the z-cut, monolithic lithium niobate 11 was 50 mm×7.5 mm×0.5 mm, consisting of two 2-cm PPLN sections 111 and 112 sandwiching an unpoled dispersion section 113. Both ends of the lithium niobate 11 were optically polished and did not have any optical coating. The length of the dispersion section 113 varied from 1 cm on one side to 1 cm+6$l_c$ on the other side, wherein $l_c$ is the coherence length defined previously. The −z and +z surfaces (or the crystallographic +c and −c surfaces) of the dispersion section 113 was coated with metal electrodes. To conduct the proof-of-principle experiment, a grating period of $\Lambda_g=3l_c=$ 20.25 μm was chosen for performing $3^{rd}$ order QPM SHG phase-matched at 70° C. at the 1064 nm fundamental wavelength. Although the second PPLN grating had a slant angle of 5.4 mrad for this experiment, the grating period in the laser propagation direction was maintained at 20.25 μm in the photomask of the present invention.

For the case of $P_1=P_2=P_\omega$, Eq. (2) becomes $P_{2\omega}=4P_\omega \cos^2(\Delta\phi)$, which indicates the possibility of making this device into an optical switch, if $\Delta\phi$ varies over a range of 180°. In practice, it is difficult to cancel out $E_{2\omega,1}$ and $E_{2\omega,2}$ completely even though $l_1=l_2$, because asymmetry in focusing, pump depletion, and temperature gradient all affect the sum of the two fields. When the focal point is at the center of this device, the first PPLN generates SHG from a converging beam and the second one generates SHG from a diverging beam. These two SHG fields do not cancel exactly even they are out of phase by 180°. Focusing the pump beam loosely may alleviate this problem at the sacrifice of the conversion efficiency. To enhance the contrast in the SHG amplitudes, one may also rotate the lithium niobate crystal of the design in FIG. 1 about the c axis. When rotating the lithium niobate about the c axis, one increases the grating period in the first PPLN section, whereas one may either increase or decrease the grating period in the second PPLN section, depending on the direction of rotation. By detuning the resonance in one of the two PPLNs, the amplitude contrast of the SHG power at the output can be enhanced. This phenomenon was indeed observed in the embodiment of the present invention.

Figure 2:
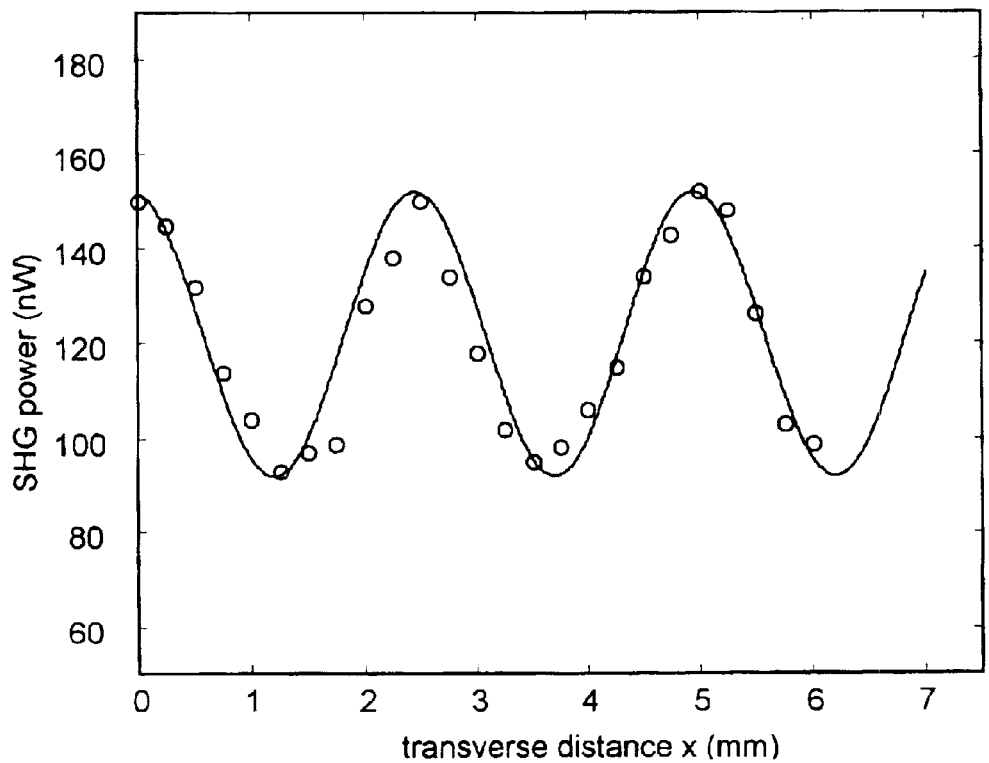
FIG. 2 is a plot showing the SHG power versus the transverse distance x, where the open dots are the experimental data, the solid curve is the theoretical fit of $P_{2\omega}=122+30\cos[2\pi(x+0.05)/2.5]$ (nW) with x in millimeters, and the periodicity of 2.5 mm in x corresponds to the change of two coherence lengths in ld.

A 4-mW Nd:YVO4 laser at the 1064-nm wavelength was focused into the crystal by a 5-cm focal length lens. By using a micrometer, the crystal was pushed in the transverse direction x to vary the dispersion length $l_d$ and verified Eq. (2)'s dependence on $l_d$. FIG. 2 shows the SHG power versus the transverse distance x, where the open dots are the experimental data and the solid curve is the theoretical fit of $P_{2\omega}=122+30 \cos[2\pi(x+0.05)/2.5]$ (nW) with x in millimeters. Because the length of the dispersion section varied six coherence lengths over its 7.5 mm width, the 2.5 mm periodicity in FIG. 2 agrees well with the $2l_c$ periodicity predicted in Eq. (2). The 92 nW background SHG power was primarily due to the focusing of the pump beam.

Figure 3:
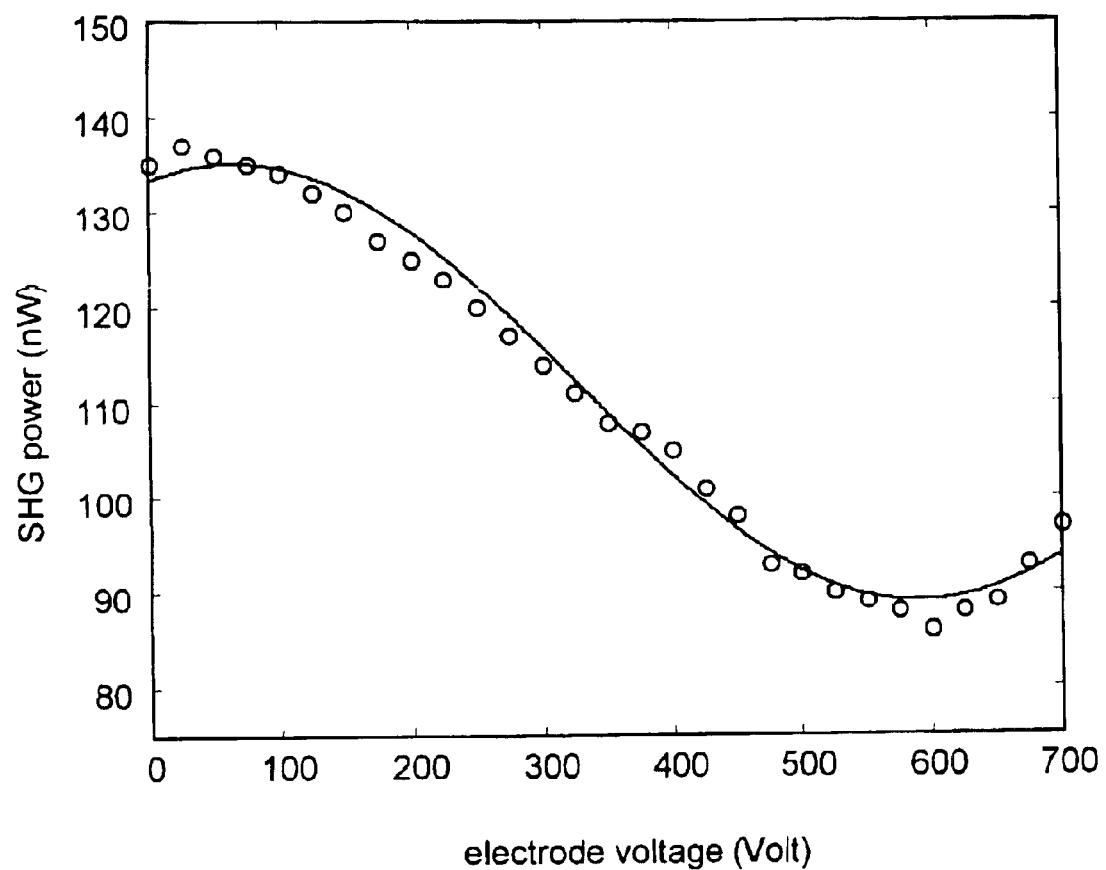
FIG. 3 is a plot showing the SHG output power versus the voltage on the dispersion section, where the open dots are experimental data, the solid curve is the theoretical fit of $P_{2\omega}=112+23\cos[\pi(V-65)/525]$ (nW) with V in volts.

FIG. 3 illustrates the electro-optic phase control on the SHG output power by applying a voltage to the electrodes in the dispersion section. The open dots are experimental data and the solid curve is the theoretical fit of $P_{2\omega}=112+23 \cos[\pi(V-65)/525]$ (nW) with V in volts. Comparing the phase term in Eq. (3), one may conclude a half-wave voltage of 525 volt. With $\lambda_\omega=1064$ nm and $\lambda_{2\omega}=532$ nm, the refractive indices of the extraordinary waves in lithium niobate are $n_{\omega,e}=2.1758$ and $n_{2\omega,e}=2.2369$ In general, the Pockels coefficient $r_{33}$ is also wavelength dependent, but previous measurements for lithium niobate vary from literature to literature. Assume $r_{33}$ at 532 nm is not too different from $r_{33}=30.9$ pm/volt at the 633-nm wavelength. With d=0.5 mm, $l_d=1$ cm, and the measured half-wave voltage of 525 volts, Eq. (4) gives $r_{33}=29.4$ pm/volt for the 1064-nm wavelength.

Figure 4:
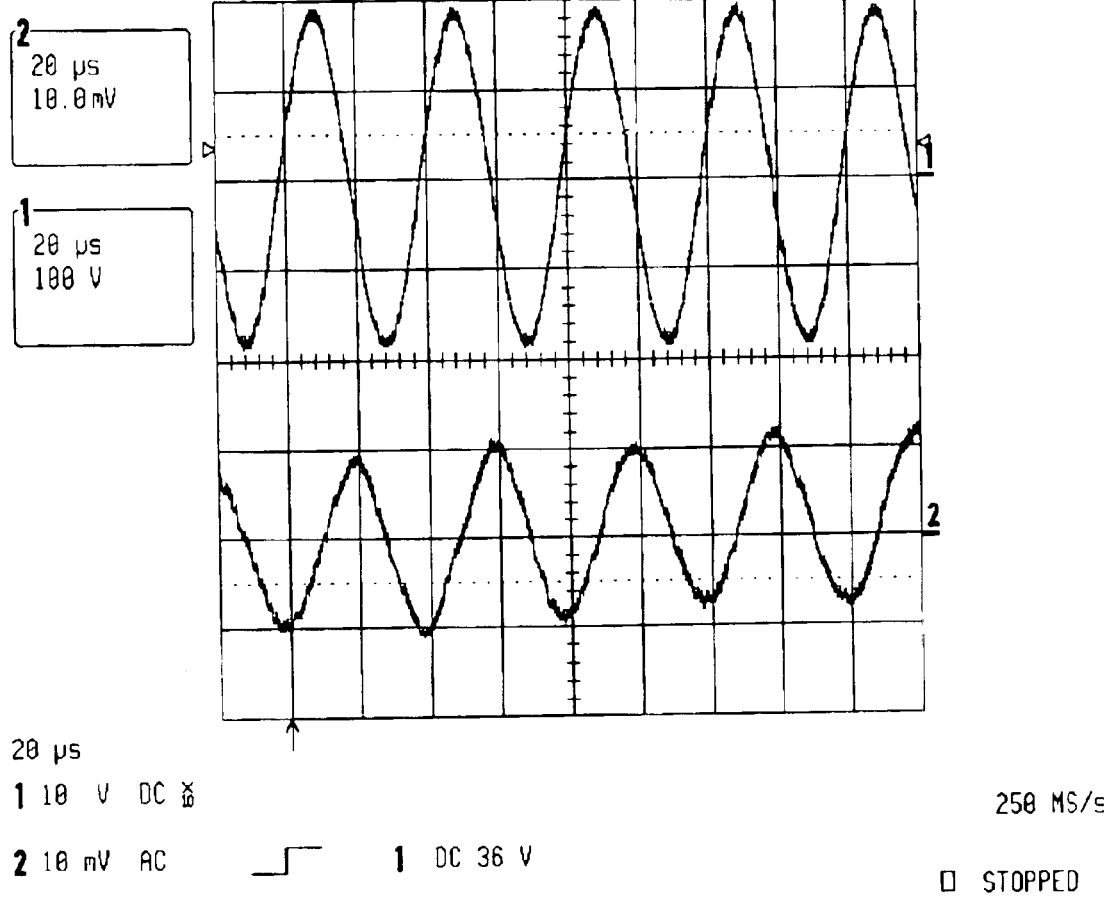
FIG. 4 shows the SHG signal (Channel 2) was modulated by a 2.5-kHz, 180-volt sinusoidal wave (Channel 1), where the modulation depth was about 17%.

FIG. 4 shows the evidence of the amplitude modulation on the SHG signal (Channel 2), when a 2.5 kHz, 180-volt sinusoidal wave (Channel 1) was applied to the electrodes. Before taking the oscilloscope traces, the lithium niobate crystal was moved transversely by using a micrometer until the modulation point was at the midway between the maximum and the minimum SHG power in FIG. 3. With a 180-volt sinusoidal wave, the modulation depth, defined by $(P_{2\omega,max}-P_{2\omega,min})/(P_{2\omega,max}+P_{2\omega,min})$, was about 17%.

In conclusion, simultaneous amplitude modulation and wavelength conversion have demonstrated by using a monolithic PPLN crystal in this invention. The device consisted of an electrode-coated dispersion section sandwiched between two QPM crystal sections. By electrically controlling the relative phase between the fundamental and SHG waves in the dispersion section, the SHG power of a frequency doubled 1064-nm laser were modulated. With a 1-cm electrode length and a 0.5-mm electrode separation, the half-wave voltage was 525 volts. A more meaningful half-wave voltage for this particular example is given by 1.1 volt×d (μm)/$l_d$ (cm), where d is the separation of the electrodes and $l_d$ is the length of the electrodes. If a PPLN waveguide on an x-cut wafer (Kiminori Mizuuchi and Kazuhisa Yamamoto, *Opt. Let.* 23 1880 (1998)) is used, the half-wave voltage can be reduced to a few volts due to the micron-size electrode width.

Figure 5:
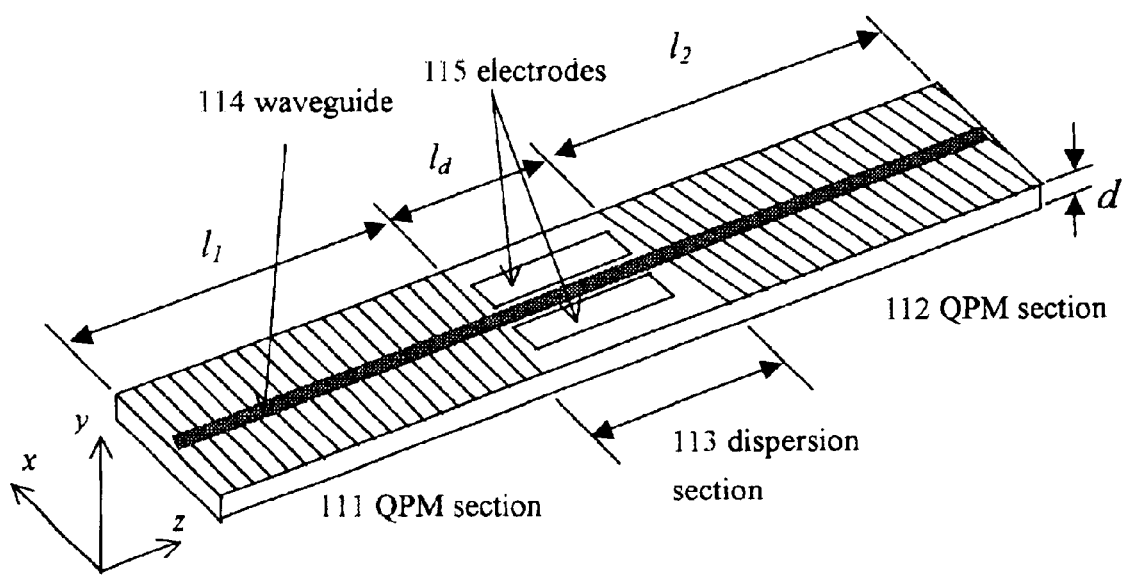
FIG. 5 shows a micron width optical waveguide on a nonlinear crystal substrate with the same design configuration according to the preferred embodiment of the present invention.

FIG. 5 shows an optical waveguide 114 fabricated on a nonlinear optical crystal substrate with the same design configuration according to the preferred embodiment of the present invention. As illustrated in FIG. 5, the waveguide is fabricated on the surface of the nonlinear optical crystal for guiding the mixing waves through the QPM sections and the dispersion section in the nonlinear optical crystal, whereby performing the nonlinear frequency conversion and amplitude modulation simultaneously. The modulation electrodes are coated with conducting materials 115 on the two sides of the waveguide, whereby the relative phase of said mixing waves is controlled by the applied electric field on the electrodes. For example, a 10 micron width PPLN waveguide on an x-cut lithium niobate wafer with the same design configuration of the present invention has a half-wave voltage of 11 volts. This low voltage allows high-speed modulation for various wide-bandwidth applications such as optical communications. The same technique for simultaneous amplitude modulation and frequency conversion can be applied as well to other phase-sensitive nonlinear processes, including optical parametric generation, sum frequency generation, and difference frequency generation.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. An optical element operable for performing nonlinear frequency conversion and amplitude modulation simultaneously, comprising a nonlinear optical crystal having an electrode-coated dispersion section in quasi-phase-matched (QPM) sections for electrically controlling the relative phase among the mixing waves therein by applying an electric field thereto, whereby performing said nonlinear frequency conversion and amplitude modulation simultaneously;

wherein said electrode-coated dispersion section is sandwiched between quasi-base-matched nonlinear gratings, said nonlinear gratings have both the grating vectors parallel to the wave vector of said mixing waves, and said amplitude modulation is dynamically adjusted to the desirable modulation regime with a direct-current voltage offset on the electrodes.

2. The optical element according to claim 1, wherein said nonlinear optical crystal is a material operable for being made into quasi-phase-matched (QPM) nonlinear optical elements.

3. The optical element according to claim 2, wherein said nonlinear optical crystal is made of the material selected from a group consisting of $LiNbO_3$, $LiTaO_3$, $KTiOPO_4$, and $RbTiOAsO_4$.

4. The optical element according to claim 1, wherein said electrode-coated dispersion section is coated with metal electrodes on two opposite surface thereof.

5. The optical element according to claim 1, wherein said nonlinear frequency conversion includes second harmonic generation (SHG), difference frequency generation (DFG), sum frequency generation (SFG), optical parametric generation (OPO), optical parametric amplification (OPA), and optical parametric oscillation (OPO).

6. An optical element operable for performing nonlinear frequency conversion and amplitude modulation, simultaneously, comprising a nonlinear optical crystal having an electrode-coated dispersion section in quasi-phase-matched (QPM) sections for electrically controlling the relative phase, among the mixing waves therein by applying an electric field thereto, whereby performing said nonlinear frequency, conversion and amplitude modulation simultaneously;

wherein said electrode-coated dispersion section is sandwiched between quasi-phase-matched nonlinear gratings, one of said nonlinear gratings has the grating vector parallel to the wave vector of said mixing waves, the other said nonlinear grating has the grating vector forming an angle with respect to the wave vector of said mixing waves, and said amplitude modulation is dynamically adjusted to the desirable modulation regime by laterally translating the nonlinear crystal with respect to stationary mixing waves.

7. The optical element according to claim 6, wherein said nonlinear optical crystal is a material operable for being made into quasi-phase-matched (QPM) nonlinear optical elements.

8. The optical element according to claim 7, wherein said nonlinear optical crystal is made of the material selected from a stoup consisting of $LiNbO_3$, $LiTaO_3$, $KTiOPO_4$, and $RbTiOAsO_4$.

9. The optical element according to claim 6, wherein said electrode-coated dispersion section is coated with metal electrodes on two opposite surface thereof.

10. The optical element according to claim 6, wherein said nonlinear frequency conversion includes second harmonic generation (SHG), difference frequency generation (DEG), sum frequency generation (SFG), optical parameter generation (OPG), optical parametric amplification (OPA), and optical parametric oscillation (OPO).

* * * * *